(12) United States Patent
Le Leannec et al.

(10) Patent No.: US 8,577,157 B2
(45) Date of Patent: Nov. 5, 2013

(54) CONDITIONAL REPLENISHMENT FOR MOTION JPEG2000

(75) Inventors: Fabrice Le Leannec, Mouaze (FR); Xavier Henocq, Mouaze (FR)

(73) Assignee: Canon Kabushiki Kaisha, Tokyo (JP)

( * ) Notice: Subject to any disclaimer, the term of this patent is extended or adjusted under 35 U.S.C. 154(b) by 1064 days.

(21) Appl. No.: 11/570,570

(22) PCT Filed: Jul. 8, 2005

(86) PCT No.: PCT/IB2005/002548
§ 371 (c)(1),
(2), (4) Date: Feb. 12, 2008

(87) PCT Pub. No.: WO2006/006077
PCT Pub. Date: Jan. 19, 2006

(65) Prior Publication Data
US 2008/0253666 A1    Oct. 16, 2008

(30) Foreign Application Priority Data
Jul. 8, 2004 (FR) .................................. 04 07648

(51) Int. Cl.
*G06K 9/46* (2006.01)
(52) U.S. Cl.
USPC ........... 382/232; 382/233; 382/246; 709/247; 709/203
(58) Field of Classification Search
USPC ..................... 382/233, 232, 246; 375/240.25; 709/247; 235/494
See application file for complete search history.

(56) References Cited

U.S. PATENT DOCUMENTS

| 6,178,204 B1 * | 1/2001 | Hazra ................. 375/240.25 |
| 7,315,651 B2 * | 1/2008 | Sakuyama et al. ......... 382/232 |
| 7,386,179 B2 * | 6/2008 | Takagi .................. 382/232 |
| 7,397,958 B2 * | 7/2008 | Le Leannec et al. ....... 382/233 |
| 7,423,649 B2 * | 9/2008 | Henocq et al. ........... 345/473 |
| 7,426,305 B2 * | 9/2008 | Denoual et al. .......... 382/233 |

(Continued)

FOREIGN PATENT DOCUMENTS

FR    2 846 181 A1    4/2004

OTHER PUBLICATIONS

Islam et al., "JPEG2000 for Wireless Application" Proc Proceedings to 5PIE—The International Society for Optical Engineering; Applications of Digital Image Processing XXVI, San Diego, CA, vol. 5203, Aug. 5, 2003, pp. 255-271, Abstract.*

(Continued)

*Primary Examiner* — Mekonen Bekele
(74) *Attorney, Agent, or Firm* — Fitzpatrick, Cella, Harper & Scinto

(57) ABSTRACT

The invention relates to a method and a device for transmitting a current image of a sequence of digital images between a server device and a client device which are connected by a communication network. Each image of the sequence is encoded in a multi-resolution format, each resolution comprising a set of non independent elementary entities. The method of the invention comprises detecting motion, carried out on spatial entities defined with respect to said elementary entities, between the current image and a reference image, then determining a first set of elementary entities comprising the elementary entities relating to said at least one moving spatial entity and determining a second set of elementary entities which are necessary for reconstructing said moving spatial entities. Finally, at least part of each of the elementary entities of said first and second sets is sent to the client device.

44 Claims, 10 Drawing Sheets

(56) References Cited

U.S. PATENT DOCUMENTS

Figure 1:
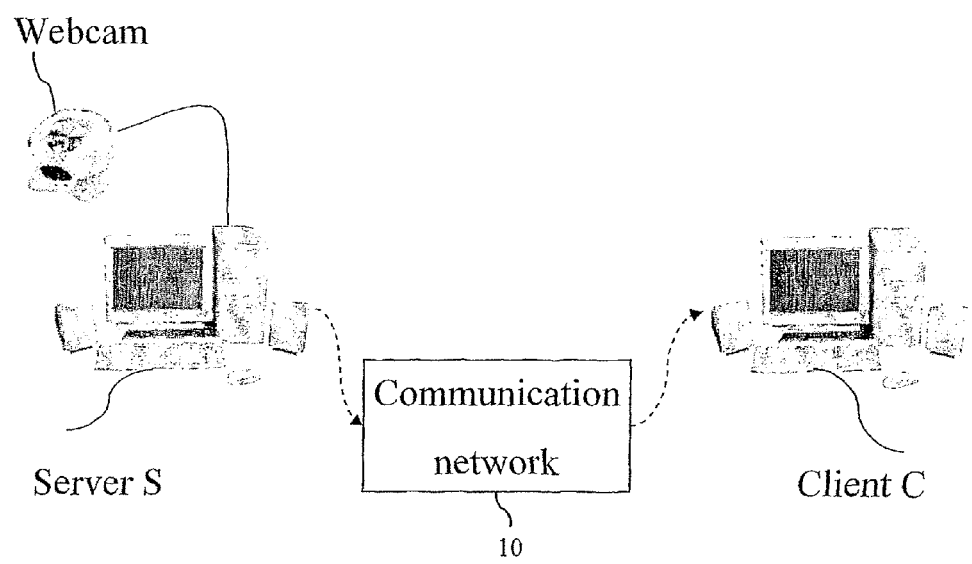

| | | | |
|---|---|---|---|
| 7,447,369 B2* | 11/2008 | Gormish et al. | 382/235 |
| 7,460,724 B2* | 12/2008 | Gormish | 382/240 |
| 7,543,327 B1* | 6/2009 | Kaplinsky | 725/105 |
| 7,721,971 B2* | 5/2010 | Yano | 235/494 |
| 7,822,281 B2* | 10/2010 | Becker et al. | 382/239 |
| 8,009,735 B2* | 8/2011 | Le Leannec et al. | 375/240.16 |
| 2003/0018818 A1* | 1/2003 | Boliek et al. | 709/247 |
| 2004/0136598 A1 | 7/2004 | Le Leannec et al. | 382/232 |
| 2004/0175046 A1* | 9/2004 | Gormish | 382/232 |
| 2004/0175047 A1* | 9/2004 | Gormish et al. | 382/232 |
| 2005/0100229 A1* | 5/2005 | Becker et al. | 382/232 |
| 2006/0262345 A1* | 11/2006 | Le Leannec et al. | 358/1.15 |

OTHER PUBLICATIONS

McCanne et al., "Low-Complexity Video Coding for Receiver-Driven Layered Multicast", IEEE, vol. 15, No. 6, published on Aug. 1997, pp. 983-1001.*

McCanne et al., "Low-Complexity Video Coding for Receiver-Driven Layered Multicast", IEEE Journal on Selected Areas in Communications, IEEE Inc. New York, vol. 15, No. 6, Aug. 1997, pp. 983-1001, XP000694449.

Islam et al., "JPEG2000 for Wireless Application" Proc Proceedings fo SPIE—The International Society for Optical Engineering; Applications of Digital Image Processing XXVI, San Diego, CA, vol. 5203, Aug. 5, 2003, pp. 255-271, XP002316046—and Database Compendex 'online! Engineering Information, Inc., New York, Proc. SPIE, Appl. of Dig. Image Process. XXVI, Aug. 5, 2003 Islam Asad et al: "JPEG2000 for Wireless Applications" Database accession No. E2004218169643 abstract.

Taubman et al., "Architecture, Philoshophy, and Performance of JPIP: internet protocol standard for JPEG2000" Proceedings of the SPIE, SPIE, Bellingham, VA, vol. 5150, No. 1, 2003, pp. 791-805 XP002282186.

Taubman et al., "JPEG2000, Image Compression Fundamentals, Standards and Practice" Kluwer Int'l Series in Engineering and Computer Science, Norwell, MA: Kluwer Academic Publ. US, 2002, pp. 449-464, XP002316044.

* cited by examiner

CONDITIONAL REPLENISHMENT FOR MOTION JPEG2000

The present invention relates to a method and a device for transmitting digital video.

The invention relates to the field of low-rate video transmission, in particular for a video surveillance application. It applies in particular for the Motion JPEG2000 compression format ("JPEG2000 Part 3 Final Draft International Standard", ISO/IEC JTC1/SC29 WG1), and more generally for a compression format which consists of successively compressing each image of a video sequence as a fixed image, independently of the other images of the sequence. Consequently, this type of compression system does not take account of the possible similarity between successive images of the sequence. The advantage of such a system is to offer the possibility of extracting any image of the sequence, at any given time. Moreover, this avoids the propagation of any transmission errors between a number of successive images of a sequence.

However, such a compression format is not very efficient in the case where there is little motion in a video sequence, since it involves the transmission of a large amount of redundant compressed data.

There is known in the prior art, in particular in the article "Low-complexity Video Coding for Receiver-driven Layered Multicast", McCanne et al, IEEE Journal of Selected Areas in Communications, 1997, a video encoding algorithm known as the "conditional replenishment" algorithm, which is used in real time video transmission systems on networks with packet losses such as the Internet. Conditional replenishment is applied to images divided into macroblocks (typically blocks of coefficients of size 16×16 for usual compression formats such as MPEG-2), which are encoded independently of one another. The algorithm consists of carrying out an operation of detecting motion on macroblocks between the current image of the sequence and a reference image. The macroblocks detected as moving are compressed and transmitted, and their original version is copied into the reference image, which serves to detect motion for the following images of the sequence.

This method cannot be applied directly in the case of the Motion JPEG2000 compression format, since for this format the images are not encoded by independent macroblocks.

The Motion JPEG2000 format consists of compressing each image of the sequence according to the JPEG2000 standard. The multi-resolution compression algorithm is based on a spatial frequency transformation (discrete wavelet transformation), quantization and entropic coding of the data. The image may be broken down into rectangular portions known as tiles, which are encoded independently, which may cause discontinuities of the reconstructed signal at the edges of the tiles. In order to allow rapid access to any zone of a compressed image, the JPEG2000 format recommends entropic coding by elementary rectangular blocks in the frequency sub-bands, called code blocks, which are grouped together in the compressed format as a function of their spatial position in the image at a given resolution to form elementary encoding units known as precincts. The elementary encoding units, unlike tiles, cannot be reconstructed independently of one another, but their reconstruction does not cause visual artefacts as in the case of tiles.

Patent application US20030219162 proposes a method for reducing the redundancy of compressed data in the case of video sequences encoded in Motion JPEG2000 format and exhibiting little motion. The proposed method consists of detecting motion in the compressed domain between successive images of the sequence, by independently compressed rectangular portions, that is to say by tiles, and not transmitting the data packets corresponding to the static parts. This therefore involves, as in the case of conditional replenishment, processing independently encoded portions of images. The use of tiles for the JPEG2000 format may cause visual artefacts for the reconstruction. Moreover, in the case where the tiles formed are small in size (for example 128×128), decoding of an image takes quite a long time and is complicated. Furthermore, if the tiles formed are large in size, motion detection on these zones does not make it possible to considerably reduce the redundancy of the transmitted data.

The object of the present invention is to solve this problem by proposing a system which makes it possible to significantly reduce the amount of compressed data in the Motion JPEG2000 format when the video sequence comprises little motion, while avoiding artefacts upon reconstruction.

To this end, the invention proposes a method of transmitting a current image of a sequence of digital images between a server device and a client device which are connected by a communication network, each image of the sequence being encoded in a multi-resolution format, each resolution comprising a set of non-independent elementary entities, comprising the steps of:

detecting motion, carried out on spatial entities defined with respect to said elementary entities, between the current image and a reference image;

if at least one moving spatial entity is detected, determining a first set of elementary entities comprising the elementary entities relating to said at least one moving spatial entity, determining a second set of elementary entities which are necessary for reconstructing said moving spatial entities;

sending to the client device at least part of each of the elementary entities of said first and second sets.

Thus, the invention makes it possible to send to the client device only the data needed to define the zones the spatial aspect of which has changed in the sequence of images. These zones are advantageously defined in relation to the elementary encoding entities, therefore there is no excess cost in terms of computation for determining the compressed data to be transmitted with respect to the moving zones.

According to one feature of the invention, the transmission method furthermore comprises sending to the client device an auxiliary information item which indicates the elementary entities of the first set. In this way, the minimum amount of information needed by the client to determine the moving zones in the current image of the sequence is transmitted.

According to a first mode of implementation, the images are transmitted in accordance with a transmission protocol associated with the encoding format, and said auxiliary information item comprises indices which identify the elementary entities of the first set in accordance with said transmission protocol, in the form of an optional field of metadata type which is compatible with the transmission protocol. By virtue of this feature, the transmission method according to the invention is compatible with the standard encoding format.

Alternatively, according to a second mode of implementation, the images are transmitted in accordance with a transmission protocol associated with the encoding format, and said auxiliary information item is associated with a data category.

According to another feature of the invention, the transmission method furthermore comprises a step of updating the reference image, consisting of storing the image signal relating to said at least one moving spatial entity of the current image as a replacement for the image signal relating to the at least one spatial entity of the same position in the reference image. The reference image is then representative of the current image of the video sequence.

In a preferred mode of implementation, it is considered that the images of the sequence are encoded using an encoding method comprising the steps of spatial frequency transformation, quantization and entropic coding. According to one particularly advantageous feature, the steps of quantization and entropic coding are applied only to the coefficients resulting from the spatial frequency transformation belonging to the elementary entities of the first and second sets. The computational complexity is thereby reduced compared to conventional encoding, since the last two encoding steps are applied only to the subset of data to be transmitted.

According to another feature, the method according to the invention provides, upon receipt of a first request from a client device, the sending of the updated reference image to said client device. This feature makes it possible to manage multiple clients and to ensure that each client receives the reference image which was also used by the server to carry out motion detection.

The invention also makes it possible to manage the case where the resolution required by the client is lower than the initial resolution of the sequence of images, proposing for this purpose the preliminary steps of filtering and sub-sampling. These steps are applied to each image of the sequence so as to bring it to the required resolution.

Correlatively, the invention also relates to a device for transmitting a current image of a sequence of digital images between a server device and a client device which are connected by a communication network, each image of the sequence being encoded in a multi-resolution format, each resolution comprising a set of non-independent elementary entities. This device comprises:

means for detecting motion, carried out on spatial entities defined with respect to said elementary entities, between the current image and a reference image;

means for determining a first set of elementary entities comprising the elementary entities relating to said at least one moving spatial entity;

means for determining a second set of elementary entities which are necessary for reconstructing said moving spatial entities;

means for sending to the client device at least part of each of the elementary entities of said first and second sets.

The transmission device according to the invention comprises means for implementing the features described above. This device has advantages analogous to those of the associated method of transmitting a current image of a sequence of digital images.

According to another aspect, the invention also relates to a method of receiving a current image from a sequence of digital images, each image of the sequence being encoded in a multi-resolution format, each resolution comprising a set of non-independent elementary entities. This reception method is implemented by a client device in communication with a server device which implements a transmission method according to the invention. It comprises the steps of:

receiving a plurality of parts of elementary entities;

determining a first set of elementary entities among the elementary entities received corresponding to at least one spatial entity defined with respect to said elementary entities which is moving with respect to a reference image stored beforehand;

decoding the set of elementary entities received so as to reconstruct said at least one moving spatial entity; and storing the result of the decoding in a storage space containing the reference image, as a replacement for the image signal relating to the at least one spatial entity of the position thus determined.

The client device receives and decodes a reduced amount of data and therefore the processing carried out is particularly efficient compared to the case where all the data have to be decoded.

According to one feature of the invention, the reception method according to the invention comprises an additional step of displaying the reference image thus obtained. This image is representative of the current image of the sequence of images.

In a first mode of implementing the invention, the images are transmitted in accordance with a transmission protocol associated with the encoding format, and the step of determining a first set of elementary entities corresponding to at least one moving spatial entity comprises reading an auxiliary information item transmitted in accordance with the transmission protocol, said auxiliary information item containing the indices which identify the elementary entities belonging to said first set in accordance with the transmission protocol.

Thus, the determination of the moving spatial entities for which it is necessary to replenish the display is carried out rapidly and without any additional computation cost.

According to a second mode of implementation, said auxiliary information item is received in the form of the association of the data with a category defined in accordance with the transmission protocol.

The reception method according to the invention furthermore comprises a step of storing in a temporary memory space parts of elementary entities received for the current image.

According to a first mode of implementation, the parts of elementary entities received for the current image are stored in a file after the parts of elementary entities received for the preceding image of the sequence. This mode of implementation allows archiving in a file containing all the data which make it possible to decode a sequence of images. This archiving file is smaller than in the conventional archiving techniques relating to the compression format, since only some of the data are stored.

According to one feature of this first mode of implementation, the last image of the sequence of images is entirely stored in encoded form in the memory of the client device. This feature makes it possible for the client device to subsequently replay the sequence from the end.

According to a second mode of implementation, the parts of elementary entities received for the current image are stored in a storage space as a replacement for the parts of elementary entities received for the preceding image. In this second mode of implementation, the amount of data stored is minimal and corresponds to the minimum amount needed to decode/display the current sequence.

Correlatively, the invention also relates to a device for receiving a current image of a sequence of digital images, each image of the sequence being encoded in a format comprising a set of elementary entities. This device comprises:

means for receiving a plurality of parts of elementary entities;

means for determining a first set of elementary entities among the elementary entities received corresponding to at least one spatial entity defined with respect to said elementary entities which is moving with respect to a reference image stored beforehand;

means for decoding the set of elementary entities received so as to reconstruct said at least one moving spatial entity;

means for storing the result of the decoding in a storage space containing the reference image, as a replacement for the image signal relating to the at least one spatial entity of the position thus determined.

The reception device according to the invention comprises means for implementing the features of the reception method described above. This device has advantages analogous to those of the associated method of receiving an image from a sequence of digital images.

The features of the transmission and reception methods and devices according to the invention mentioned above have particular advantages in the case where the encoding format of the sequence of images is the Motion JPEG2000 format and the transmission protocol is JPIP. In this field of application, the spatial entities are the precincts defined in the standard and the elementary entities are JPIP precinct data-bins.

The invention also relates to a computer which comprises means capable of implementing the method of transmitting and the method of receiving a current image of a sequence of digital images according to the invention.

A computer program which can be read by a microprocessor comprises portions of software code capable of implementing the transmission method and the reception method according to the invention, when it is loaded and executed by the microprocessor.

A data storage means, which may optionally be partially or completely removable and can be read by a computer system, comprises instructions for a computer program capable of implementing the transmission method and the reception method according to the invention, when this program is loaded and executed by the computer system.

The computer, data storage means and computer program have features and advantages analogous to those of the methods which they implement.

Figure 2:
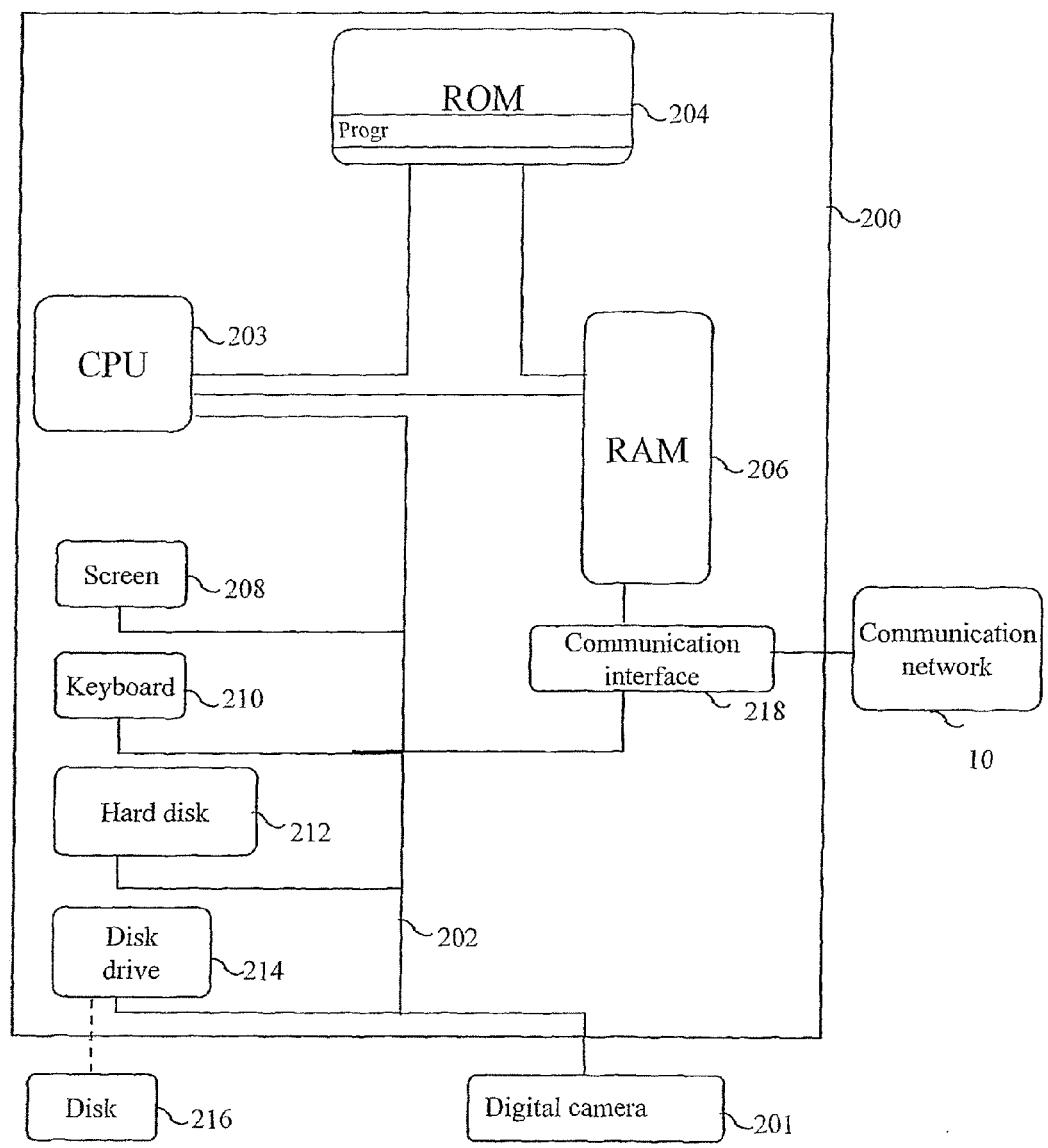
Figure 3A:
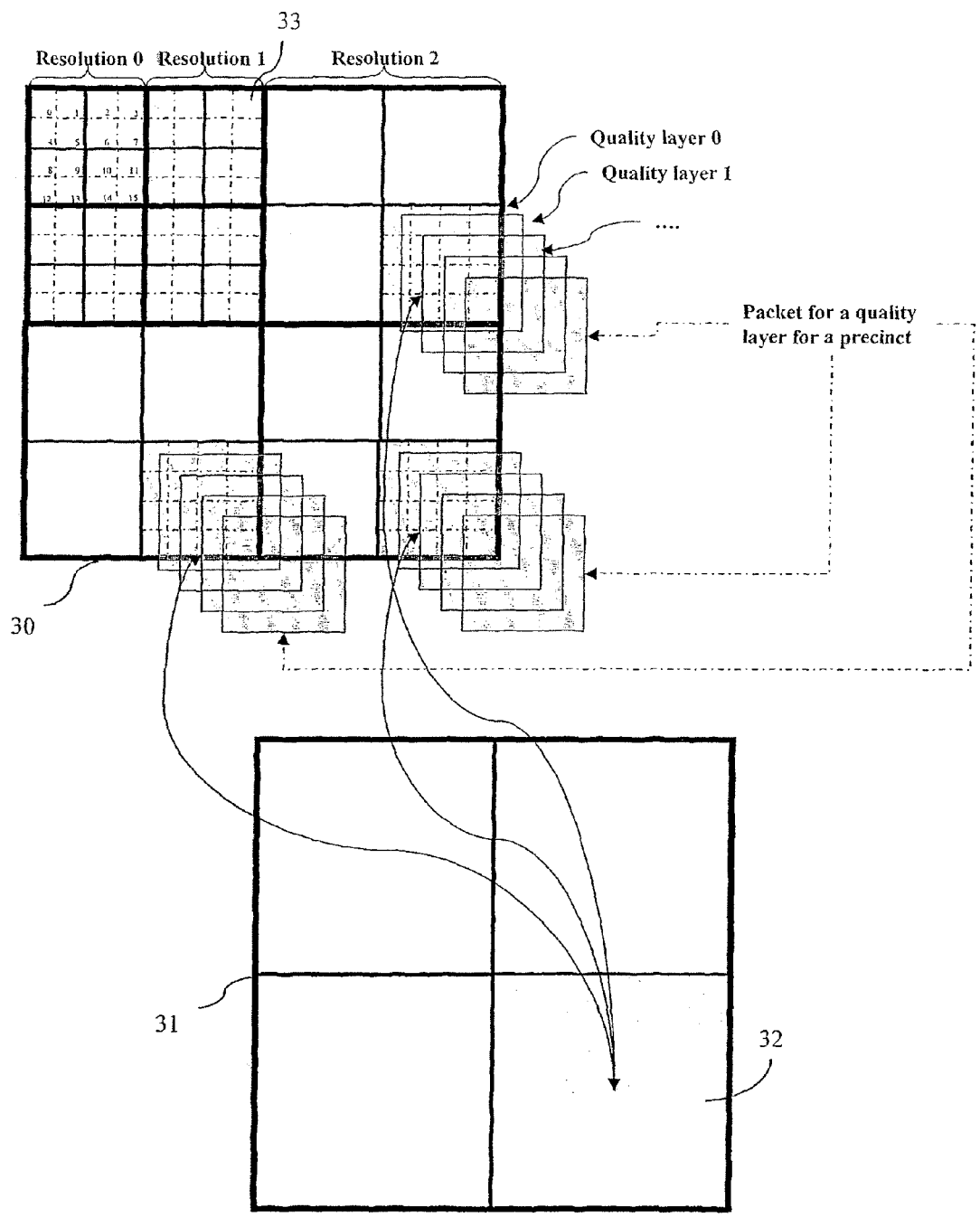
Figure 3B:
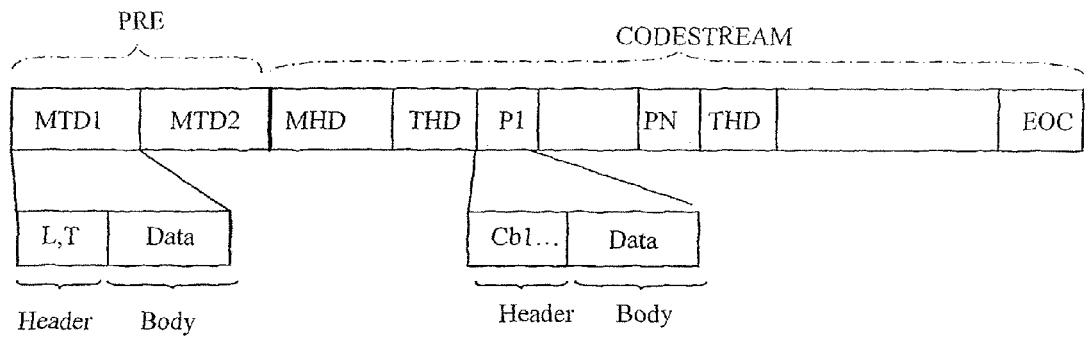
Figure 3C:
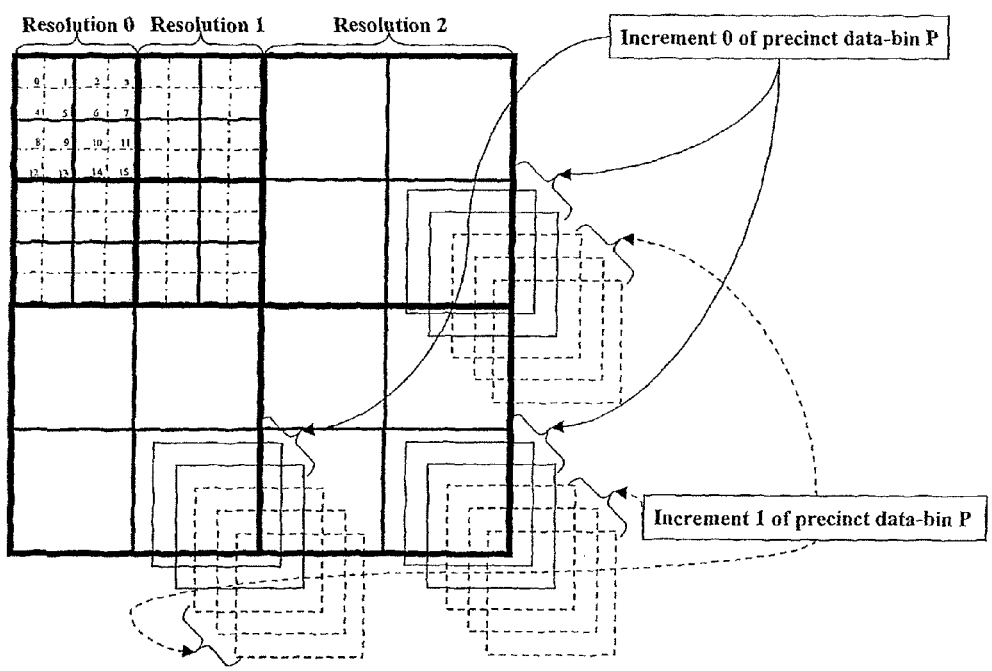
Figure 4:
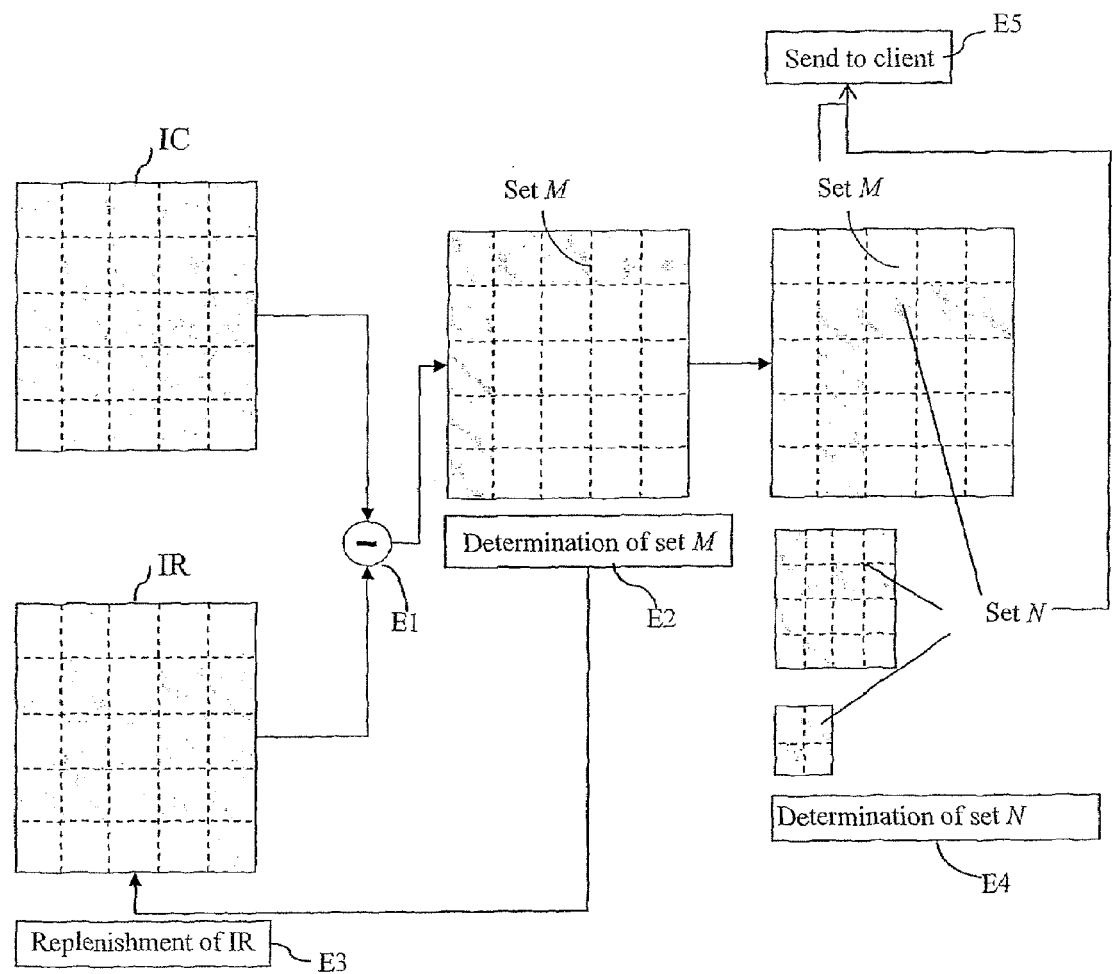
Figure 5:
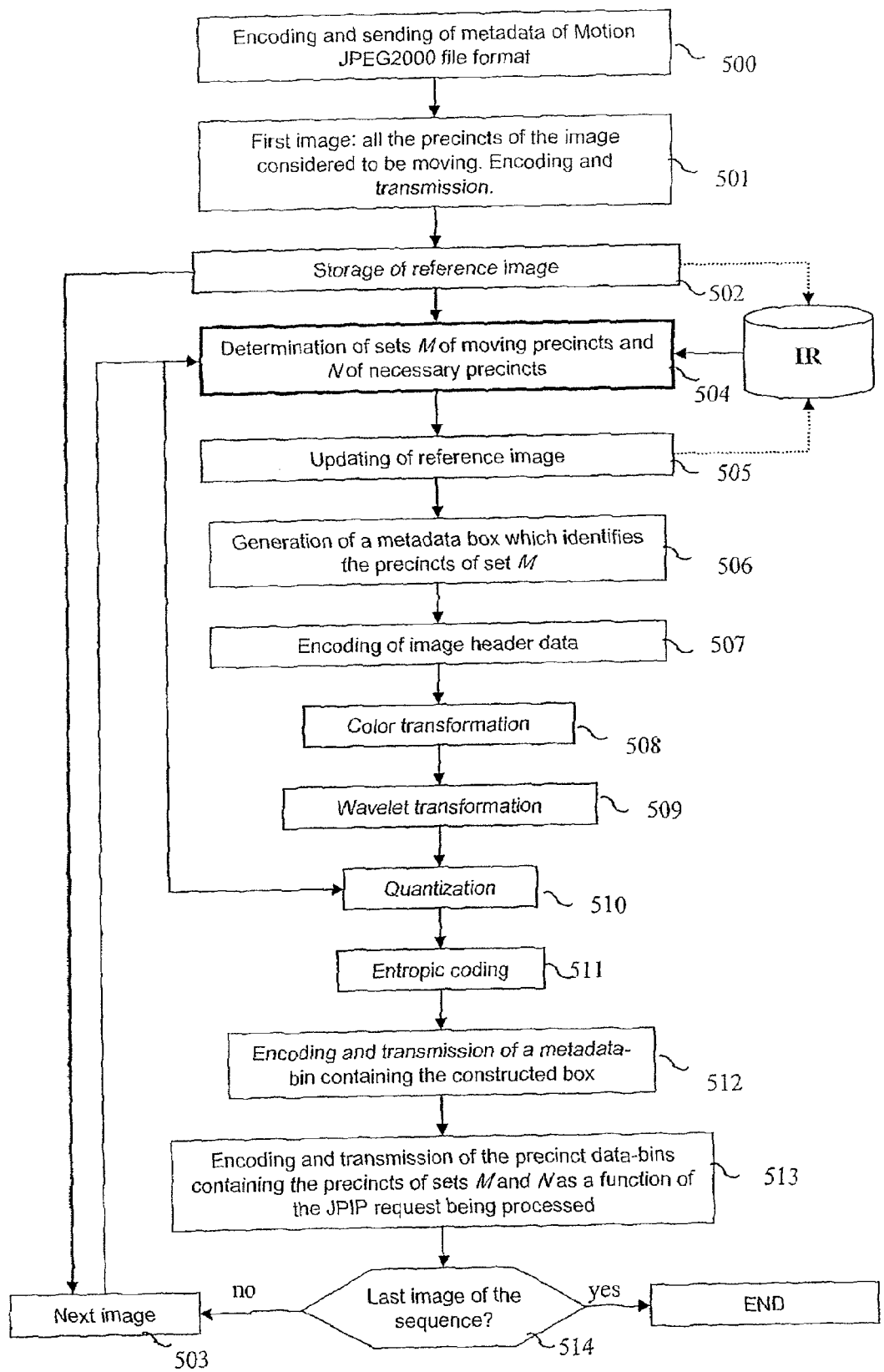
Figure 6:
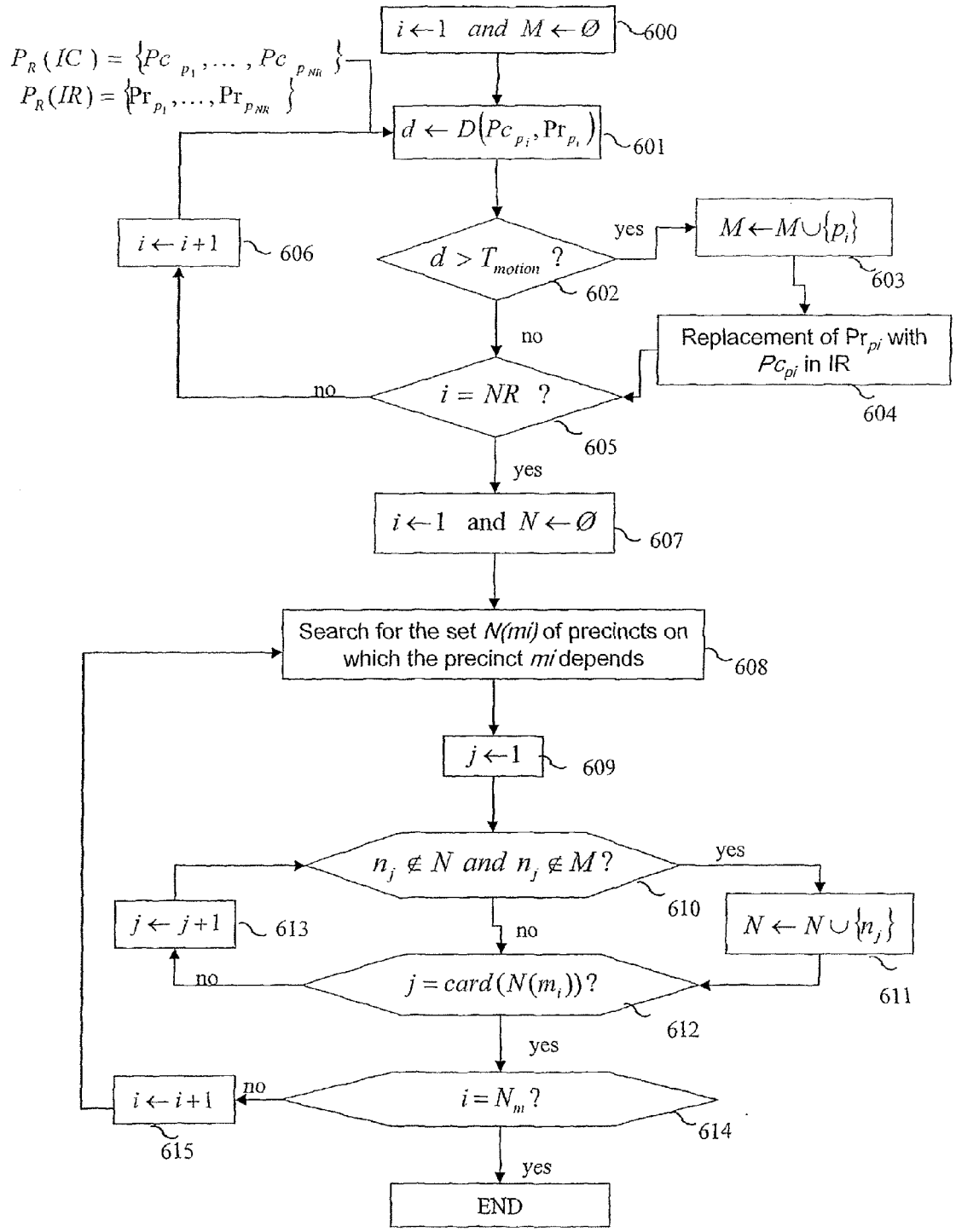
Figure 7:
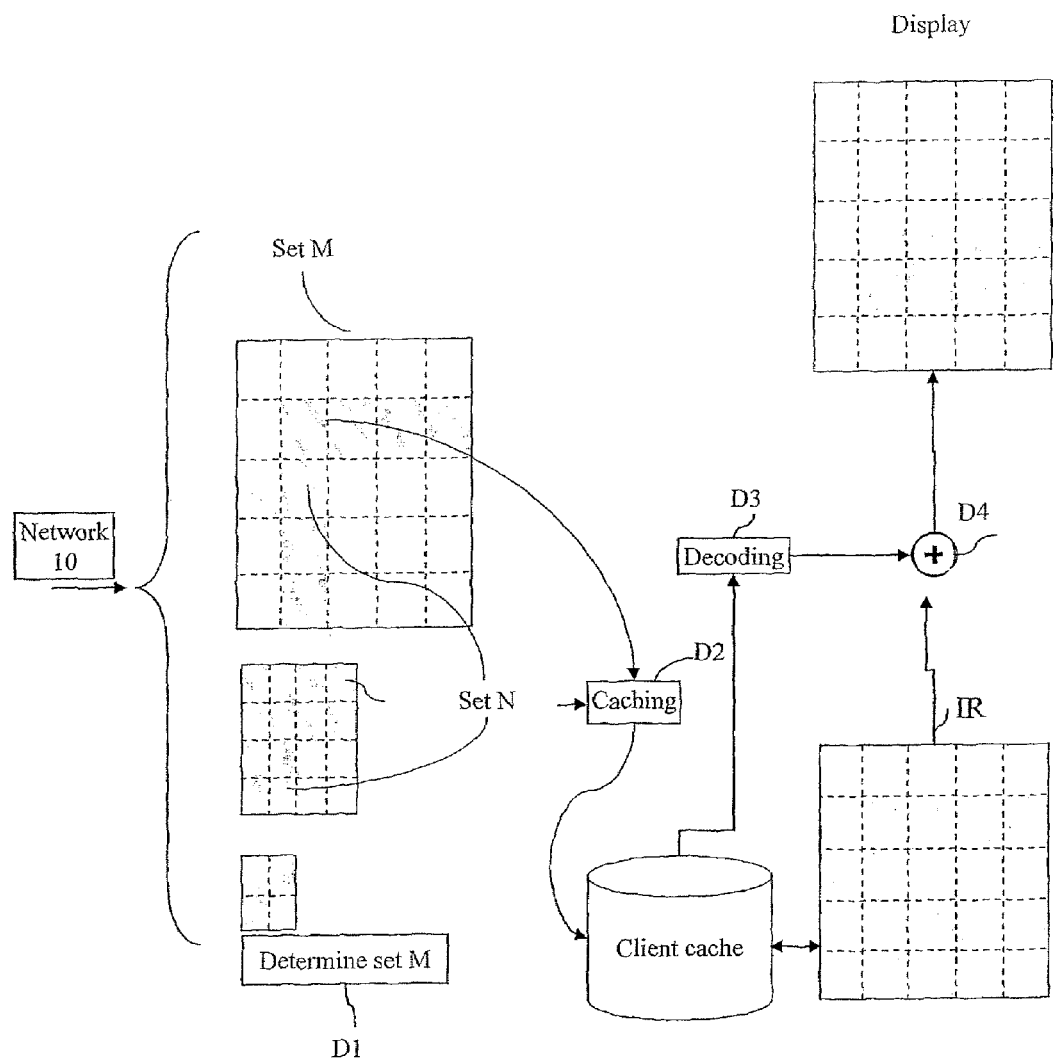
Figure 8:
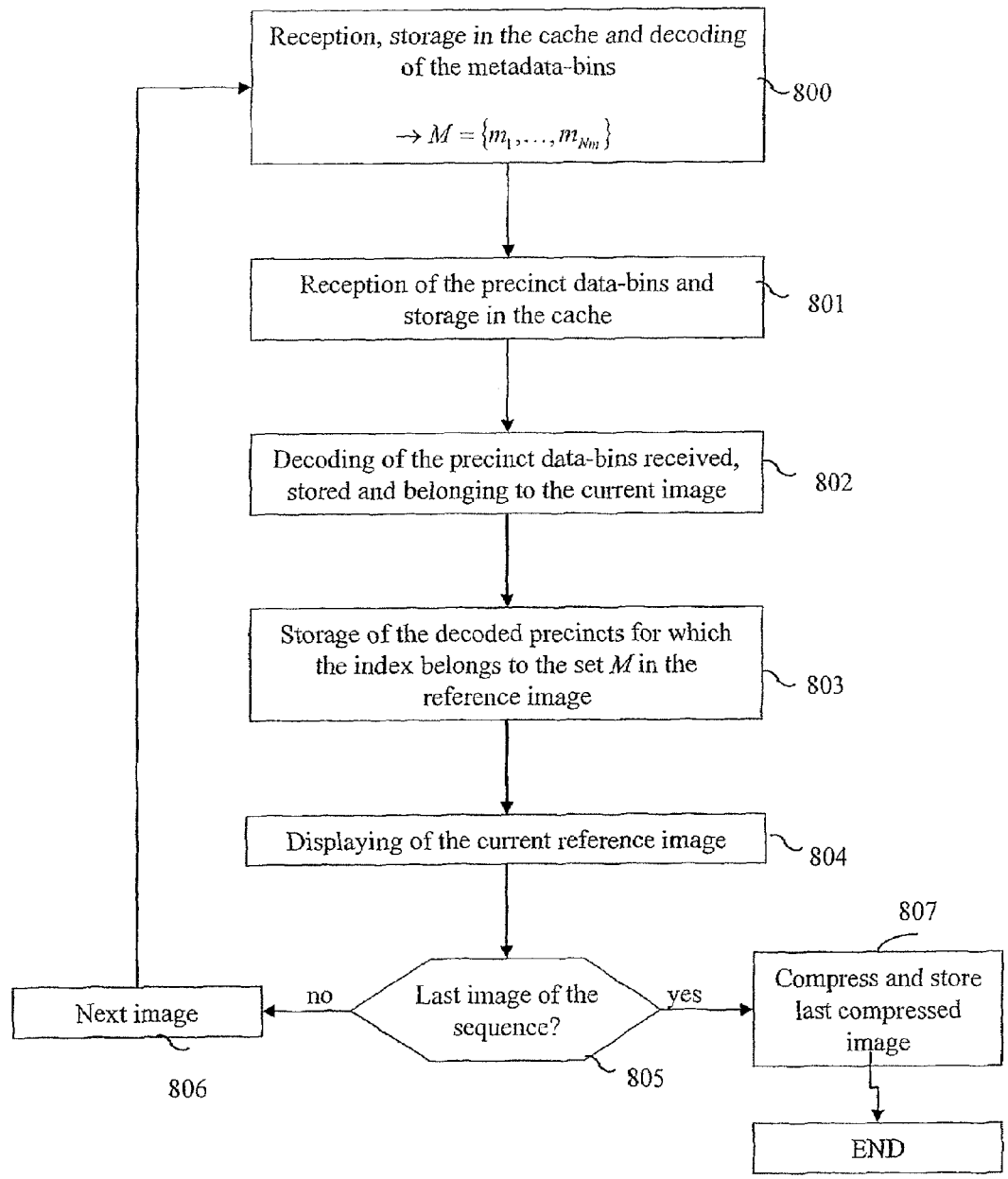
Figure 9:
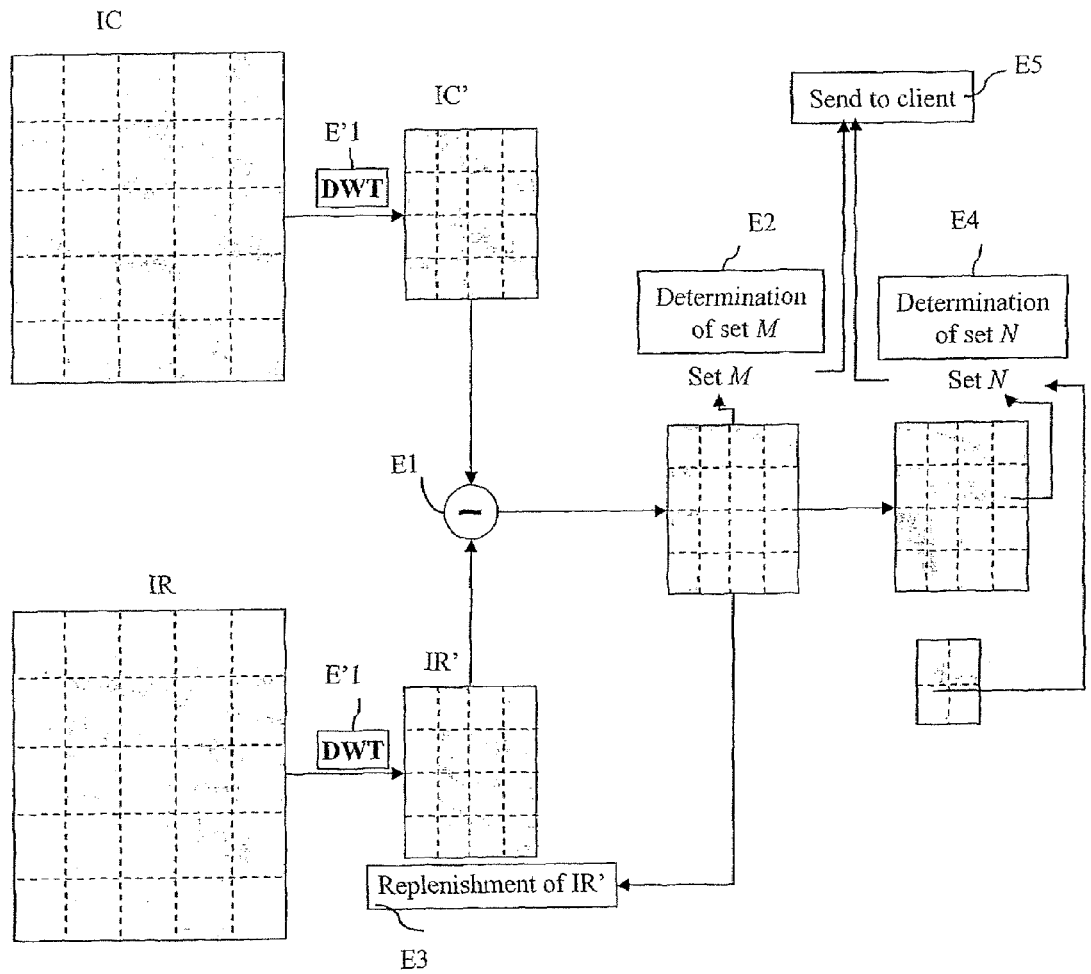

Other features and advantages of the invention will emerge from the following description, illustrated by the attached drawings, in which:

FIG. 1 schematically shows a communication network capable of implementing the invention;

FIG. 2 schematically shows a device capable of implementing the invention;

FIG. 3 schematically shows the data structures used in the JPEG2000 format (FIGS. 3a, 3b) and the associated transmission protocol JPIP (FIG. 3c);

FIG. 4 schematically shows the principle of implementing the invention on the server device;

FIG. 5 is a block diagram describing the algorithm for encoding and transmitting a sequence of images according to the invention;

FIG. 6 describes the algorithm for determining the two sets of precincts necessary for implementing the invention;

FIG. 7 schematically shows the principle of implementing the invention on the client device;

FIG. 8 describes the decoding algorithm used by the client device for the purpose of displaying the encoded sequence of images according to the invention, and FIG. 9 schematically shows the implementation of the invention on the server side when the image resolution required by the client is lower than the acquisition resolution.

FIG. 1 schematically shows the context in which the present invention is applied. A video acquisition source, such as for example a webcam, is connected to a server device S. The server device encodes the acquired video sequence in the Motion JPEG2000 compression format, either by using specific software or a card designed for this purpose. The compressed video stream thus obtained may then be transmitted to one or more clients C, via the communication network 10, for example the Internet network. The application envisaged in particular is video surveillance. The video is acquired continuously. It may be compressed and stored on the server device or else compressed and transmitted only following a request by at least one client device connected to the network.

With reference to FIG. 2, we will now describe a device capable of implementing the methods of the invention, whether this be a server device S or a client device C. Such an apparatus is for example a microcomputer 200 connected to various peripherals, for example a digital camera 201 connected to a graphic card and supplying information to be processed according to the invention.

The device 200 comprises a communication interface 218 connected to the communication network 10, capable of transmitting encoded/decoded digital data processed by the device. The device 200 also comprises a storage means 212 such as for example a hard disk. It also comprises a drive 214 for reading the disk 216. This disk 216 may be a floppy disk, a CD-ROM or a DVD-ROM for example. The disk 216, like the disk 212, may contain data processed according to the invention and also the program or programs implementing the invention which, once read by the device 200, will be stored on the hard disk 212. According to one variant, the program Progr allowing the device to implement the invention may be stored in a read-only memory 204 (called ROM in the drawing). In a second variant, the program may be received in order to be stored in a manner identical to that described above via the communication network 10.

This same device has a screen 208 which makes it possible in particular to display the decompressed data on the client device or to serve as an interface with the user who can thus parameterize certain processing modes using the keyboard 210 or any other pointer device, for example a mouse, an optical pen or a touch screen.

The central processing unit 203 (called CPU in the drawing) executes the instructions relating to the implementation of the invention, which instructions are stored in the read-only memory 204 or in the other storage elements. When it is powered up, the processing programs stored in a non-volatile memory, for example the ROM 204, are transferred to the random-access memory RAM 206 which will then contain the executable code of the invention and also registers for storing the variables needed to implement the invention.

More generally, a data storage means, which can be read by a computer or by a microprocessor and may or may not be integrated in the device and may possibly be removable, stores a program that implements the method according to the invention.

The communication bus 202 allows communication between the various elements included in the microcomputer 200 or connected to it. The representation of the bus 202 is non-limiting and in particular the central processing unit 203 is able to communicate instructions to any element of the microcomputer 200 directly or via another element of the microcomputer 200.

We will now recall, with reference to FIG. 3, some basic notions concerning the JPEG2000 format and its encapsulation in a data exchange format on the network according to the JPIP protocol, described in part 9 of the standard "JPEG2000 image coding system—Part 9: Interactivity tools, APIs and protocols—Final Committee Draft", ISO/IEC JTC1 SC29 WG1 N3052R, March 2003.

FIGS. 3a and 3b show the entities used in the JPEG2000 compression format, the code blocks and the precincts.

In a conventional manner, the images may be represented by a number of color components, for example red, green and blue components, said representation being denoted RGB.

The illustrations below refer to a single color component and apply analogously for any component.

FIG. 3a shows two representations of a component of the same image, 30 being the schematic representation of the subdivisions in the transformed domain, following application of the discrete wavelet transformation, and 31 being the associated spatial representation. In this figure, the breakdown of the image into tiles (independently processed portions) is not shown, and it is considered that the image contains a single tile. The image shown is broken down into three resolution levels, each resolution level comprising a set of sub-bands of spatial frequency coefficients. Each sub-band is cut into a set of code blocks 33, which are elementary encoding units in JPEG2000. The code blocks are associated with an index, and are grouped together, by resolution level, into precincts 32. A precinct is an elementary entity of the JPEG2000 format, which corresponds to a rectangular spatial portion in an associated spatial resolution level. As shown in FIG. 3a, each code block is encoded in a number of quality layers, one base layer and optionally a number of enhancement layers, which makes it possible to obtain a scalability in terms of quality from a single file.

In the JPEG2000 standard, a file is made up, as shown in FIG. 3b, of an optional JPEG2000 preamble (denoted PRE) and a codestream comprising a main header and at least one tile. The preamble consists of a succession of metadata boxes (for example MTD1, MTD2 in the figure). A box comprises a header (length of box, type of box) and a body containing useful data.

Each tile is formed of a tile header (THD in the figure) and a set of compressed image data known as the tile bitstream. Each tile bitstream comprises a sequence of packets, denoted P1 to PN in the figure. Each packet contains a header and a body. The body of a packet contains at least one code block. The header of each packet on the one hand summarizes the list of code blocks contained in the body in question and on the other hand contains compression parameters specific to each of these code blocks. A tile bitstream packet of a JPEG2000 file contains a set of code blocks corresponding to a given tile, a given component, a given resolution level, a given quality level and a given precinct. The bitstream ends with an end symbol (EOC).

The data compressed in accordance with the JPEG2000 format are transmitted on the network using the appropriate protocol JPIP (JPEG2000 Interactive Protocol), defined in part 9 of the JPEG2000 standard.

The JPIP protocol makes it possible to transfer portions of a JPEG2000 file. Various classes of entities of a JPEG2000 file, also called "data-bins", are provided for the future JPIP standard, including:
  meta data-bin: consists of the succession of consecutive bytes of the bitstream (byte range) contributing to a given set of meta-information on a compressed JPEG2000 image;
  precinct data-bin: in JPIP terminology, a precinct consists of the set of packets of the various quality layers of the image which correspond to the same spatial position (see FIG. 3c). These are the elementary entities for the transmission of the JPEG2000 data in accordance with this protocol.

Each class has a unique identifier "Class ID" which allows the client to distinguish between them. The JPIP protocol provides the possibility of defining new data classes in addition to those which are defined in the standard for proprietary applications. This possibility may be used to implement the invention, as will be seen below with reference to FIG. 5.

A JPIP response consists of a header paragraph in accordance with the HTTP protocol, followed by a succession of JPIP messages or increments (data-bin increments). Each response message consists of a succession of consecutive bytes each contributing in an incremental manner to a given data-bin. It consists of a header and a body.

FIG. 3c shows the notion of a precinct increment which forms the JPIP data transfer unit, and its unique numbering which makes it possible to reference it in a message in the JPIP format.

In the drawing, each precinct increment or part of an elementary entity contains a number of packets. This is not systematic, since the server is at liberty to choose the amount of useful data to be inserted into a precinct increment. Consequently, a precinct increment may contain only a portion of a packet or a number of packets and need not start or end at the boundary of a packet.

Each precinct increment is denoted by a unique identifier P, which is calculated from:
  t, index of the tile in the image;
  c, index of the component in the image;
  s, sequence number of the precinct in its tile through the resolution levels;
  num_comps, total number of components; and
  num_tiles, total number of tiles.
The formula for calculating P is given by:

$$P = t + (c + s \times \text{num\_comps}) \times \text{num\_tiles} \qquad (EQ\ 1)$$

It will be assumed hereinbelow that the precincts are identified by an index calculated by the above formula.

FIG. 4 schematically shows the principle of implementation of the invention on the server device S. The current image of the processed sequence of images, which is denoted IC, and a reference image stored in memory, which is denoted IR, are considered. The two images IC and IR are cut into blocks which are spatial entities having a size which is defined as a function of the elementary encoding entities, the precincts, in the JPEG2000 transformed domain. It is also possible to refer to corresponding precincts in the spatial domain.

The first operation (step E1) consists of detecting motion block by block in the spatial domain, this operation being carried out by comparing the difference in the signal between two blocks with respect to a predetermined threshold. For example, let $\{IC1, \ldots, ICn\}$ be the set of values of the signal of a block of the current image and $\{IR1, \ldots, IRn\}$ be the set of values of the signal of the block in the same spatial position in the reference image. A distortion metric that can be applied is given by the formula:

$$D = \left| \sum_{i=0}^{n} (IC_i - IR_i) \right| \qquad (EQ\ 2)$$

This metric is advantageous compared to the conventional metric which consists in taking the sum of the absolute values of the differences since it has the property of filtering the noise from the acquired sequence.

The motion detection consists of selecting the precincts of the current image for which the distance D obtained is greater than a predetermined threshold, $T_{motion}$.

A first set of precincts, together denoted M (shown shaded in FIG. 4), containing the precincts detected as moving, is thus determined in step E2.

The reference image IR is updated (step E3) by copying thereto the blocks corresponding to the precincts of the set M of the current image IC.

Finally, step E4 consists of detecting a second set of precincts, denoted N in the figure, which are required by a JPEG2000 decoder to decode the moving precincts. In fact, the precincts are non-independent elementary entities, as the precincts are reconstructed in accordance with other precincts As shown in FIG. 4, the set N comprises both the precincts of the resolution level at which the sequence is encoded and also the precincts of the lower resolution levels. The precincts are represented in the spatial domain for each resolution level considered in FIG. 4. The two sets of elementary encoding entities, M and N, are encoded and transmitted to the client (step E5), which can thus display the updated current image.

We will now describe, with reference to FIG. 5, the algorithm for encoding and transmitting a sequence of images according to the invention, implemented by a server device S.

This figure is described in the simple case where a single client C connects to the server S and sends a request to display the sequence. It is of course possible for the server S to use the algorithm described here in parallel for a number of clients.

The algorithm is therefore initiated by the initial request by the client. The first step 500 consists in encoding and sending the metadata of the Motion JPEG2000 file format, the structure of which has been recalled in brief with reference to FIG. 3b.

The next step 501 is the processing of the first image of the video sequence which is to be sent to the client. This image must be sent in its entirety, since by hypothesis the client does not possess any data relating to the current sequence in its cache, nor any associated reference image. This first image will become the initial reference image for the client C.

Finally, note that the first image considered here is either the entire first image of the sequence or the first image specified in the JPIP request from the client. This is because, in this latter case, the first image may not be consecutive to the image at which a given client is in the video sequence, after having momentarily stopped the video transmission. This may possibly occur if the user requests a pause. In this case, it may happen that the user asks for the video sequence to be taken up from the current moment of acquisition of the video. It is then necessary to reinitialize the reference image to the image captured at the present instant. In general, the server reinitializes the reference image each time it receives a JPIP request specifying a starting instant or an index of a starting image. Reinitializing the reference image means that all the precincts of the target resolution level are indicated to be moving, encoded, transmitted, and then displayed by the client. According to an alternative implementation, the transmission of the reference image may be temporally offset over a number of transmitted images in order to smooth out the flow rate.

The server also stores (step 502) this first image as reference image for the video being transmitted and for the client C.

Note that it is possible as an alternative to envisage a multiclient mode in which the server stores a single reference image IR which is intended for all of its clients. In this case, a first reference image is stored in accordance with step 502 upon the first connection of a first client. This image IR is then updated, and it may be sent as first image of the sequence and thus as reference image for any new client connecting to the server. In step 502, the reference image may be stored in a file on the disk of the server device, or in the memory, so as to optimize the processing time.

The remainder of the algorithm processes in a loop the images of the video sequence. The next image of the sequence is selected in step 503, which then becomes the current image IC on which the various processing operations are carried out.

The next step of the algorithm consists of determining the sets M and IV mentioned with reference to FIG. 4: the set M of moving precincts in the current image compared to the reference image IR and the set N of precincts which are needed to decode the precincts of the set M, but which are not detected as moving. The precincts are defined by their unique index in the encoded representation of the image in accordance with the JPIP protocol, as explained with reference to FIG. 3c, equation EQ 1. The details of this step of the algorithm will be described with reference to FIG. 6.

The reference image IR is then updated in step 505, by copying the image signal of the blocks corresponding to the precincts of the set M of the current image to the blocks of the same spatial position in the reference image, as shown schematically in FIG. 4.

The next part of the algorithm (step 506) consists of generating for the current image a metadata box, the content of which indicates the succession of indices of precincts contained in the set M. To do this, a new type of box of the JPEG2000 file format is created, which is dedicated to transporting this information. The creation of a type of proprietary box is authorized by JPEG2000 and does not put at risk the compatibility of the data encoded with this standard. A box of this type is thus generated and will be transmitted for each image of the video sequence.

Note that we are making the choice in this particular description to indicate the indices of the moving precincts in a specific metadata box. Nevertheless, an alternative mode of implementation is possible, by defining a new class of JPIP data-bins such as the "moving precinct data-bin". Such an approach would have the drawback of generating video streams that are not compatible with the JPIP standard in place. However, it has the advantage of not requiring the transmission of metadata, and thus of additional bytes on the network.

The next steps concern the encoding of the data in accordance with the JPEG2000 format. First of all, a header is generated for the current image in step 507, containing the main header and the tile header. In this preferred mode of implementation, the image is not divided into tiles, and therefore the stream of compressed data contains a single tile header. This is because division into tiles may cause visible artefacts for low flow rates and does not bring any advantage when division into precincts is used.

The next four steps are the conventional steps of a JPEG2000 image encoder. The steps of color transformation (508) and discrete wavelet transformation (509) are applied to all the coefficients representative of the current image. However, steps 510 and 511 of quantization and entropic coding are preferably applied only to the transformed coefficients belonging to the precincts of sets M and N. This is because only these data are necessary in order to display the current image in the client device. At the end of step 511, the server device has all the compressed data to be transmitted to the client device.

The next step 512 is the construction of a "metadata-bin" in accordance with the JPIP standard, a quick description of which has been given above with reference to FIG. 3c. This "metadata-bin", which includes the metadata box encoded in step 506, is sent to the client.

Then, a "precinct data-bin" increment is constructed for each precinct of sets M and N (step 513). The content of this increment contains the compressed version of the corresponding precinct. The data of the precinct which are effectively included in the precinct data-bin increment depend on the JPIP request received from the client or on the network bandwidth estimated by the server. This is because the latter may possibly have an effect on the rate of the video stream generated by the server via request fields intended for this use.

This step of transmitting compressed data in precinct data-bin increments ends the encoding and transmission of the current image. A test (514) is then carried out in order to determine whether the current image is the last of the sequence, in which case the algorithm of FIG. 4 is terminated. If not, the method passes to the next image (step 503) and steps 504 to 513 are repeated.

FIG. 6 describes in detail step 504 for determining the two sets of precincts needed to implement the invention.

The algorithm is divided into two parts: the first part concerns the detection of the moving precincts and the construction of the set M of the unique indices of these precincts. In the second part, for each moving precinct the set of precincts necessary to decode it is determined.

At the start of the first part of the algorithm, we will consider the sets of blocks or precincts of the target resolution level for displaying the current image R denoted $P_R(IC)$ and the set of precincts of the reference image, $P_R(IR)$. These two sets each contain NR elements, where NR is the total number of precincts in the spatial domain of the image at the resolution R. The elements of these sets are referenced by the JPIP indices, defined according to equation EQ1, denoted $p_1$ to $p_{NR}$. It is assumed in this mode of implementation that the size of the precincts is constant for all the images of the sequence processed.

In step 600, a counter i is initialized to 1 and the list of precincts to be completed, denoted M, is initialized to the empty set. Then, the distance d between the precinct of index $p_i$ of the current image and the precinct of the same index of the reference image is calculated (step 601), according to a predefined distortion metric D, such as for example the metric proposed in equation EQ2. The distance d obtained is compared with the predetermined threshold $T_{motion}$ (step 602). If this distance is greater than the threshold, the current precinct is detected as moving. Its index is added to the set of indices M in the next step 603. This also triggers updating of the reference image, by replacing the precinct $Pr_{pi}$ with the precinct $Pc_{pi}$ (step 604, corresponding to step 505 in FIG. 5). This step may also be carried out subsequently. In the case where it is carried out in parallel with the detection of the moving precincts, it is followed by step 605.

If the distance d is lower than the threshold, the method passes to step 605, where a test is carried out to determine whether the counter is equal to the number of precincts of the target resolution level considered. If this is not the case, the method passes to step 606 where the index i is incremented by 1 and steps 601 to 605 are repeated.

If the test in step 605 is positive, the method then continues to step 607, where the counter i is again initialized to 1 and the list N is initialized to the empty set.

Then, in step 608, the index i is selected from the list M, $m_i$, and a search is carried out for the set $N(m_i)$ of indices of precincts on which $Pc_{m_i}$ depends. This determination is known and is not detailed here. In general, $N(m_i)$ comprises the indices of the precincts which spatially surround $Pc_{m_i}$ in its resolution level, and also of the precincts of the lower resolution levels. $n_j$ is used to denote the elements of $N(m_i)$: $N(m_i)=\{n_1, \ldots, n_{Card(N(m_i))}\}$. Then, after having initialized a counter j to 1 (step 609), for each precinct $n_j \in N(m_i)$, a test is carried out in step 610 to determine whether it is contained in the set M or in the set N being constructed.

If it does not belong to either of the two, it is added to the set N in step 611. If it belongs to one of the sets or after step 611, the method passes to step 612 where it is verified whether the counter j is equal to the number of elements of $N(m_i)$. If this is not the case, the counter j is incremented in step 613 and steps 610 to 612 are repeated.

In the case where all the precincts of $N(m_i)$ have been run through, a test is carried out in step 614 to determine whether all the precincts of the set M, to the number of $N_m$, have been processed. If this is not the case, the counter i is increased in step 615 in order to process the next precinct starting from step 608. If the verification 614 is positive the algorithm ends.

We will now describe, with reference to FIGS. 7 and 8, the implementation of the invention on the client device.

In a manner analogous to FIG. 4, FIG. 7 schematically shows the principle of the application of the invention for a client device C. A set of compressed data are received via the communication network 10 on the client device C, in JPIP format. The client receives for each image:

a metadata box indicating for the current image the indices of the set of precincts which are detected as moving compared to the reference image.

"precinct data-bin" increments, which contain the compressed data of the precincts of the first and second sets, denoted M and N above.

In a first step D1, the metadata are decoded so as to determine the sets M and N, and the compressed data are stored in a cache memory of the client device (step D2). Moreover, the current image is decoded (step D3) using the data available in the client cache. To do this, the precincts for which no data has been received, that is to say those which do not form part of the sets M or N, are considered as a set of empty JPEG2000 packets by the decoder. It is then possible to decode an image which will contain parts that have been completely reconstructed and fuzzy parts. The reconstructed versions of the precincts indicated to be moving are then extracted from the decoded image.

The image displayed on the screen is then the composition (D4) of these reconstructed precincts and of the other precincts of the previously displayed image, which is in fact the reference image of the client device, IR. The replenishment of the displayed image is therefore carried out in a manner strictly identical to the replenishment of the reference image maintained by the encoder.

We will now describe, with reference to FIG. 8, the decoding/display algorithm used on the client device in order to displaying the sequence of images encoded according to the invention.

The first steps of the algorithm concern the reception of the data stream in JPIP format. In step 800, the metadata encapsulated in the headers of the JPIP messages are received, stored in a memory space of the client device and decoded. In particular, the set of indices of the precincts which have been detected as moving, M, is extracted during this step. Alternatively, if the indication of the set of moving precincts is transmitted via a new class of JPIP data-bin (alternative mode of implementation explained with reference to step 506 of FIG. 5), the determination of the set M of indices of moving precincts will be carried out on the basis of the indices of the precincts belonging to this new class.

Next, in step 801, the compressed data which have been received in the form of "precinct data-bins" are received and stored in the cache. The storage of the data in memory consists in deleting the compressed precincts received for the preceding image, and in filling the cache memory with the precinct data-bin increments of the current image. This is because no data of the compressed stream of the preceding image can be used to decode the moving precincts of the current image. The method proposed therefore does not involve storing compressed data of a number of images of the sequence. It therefore has no additional cost in terms of the memory consumption compared to a system based on conventional Motion JPEG2000 encoding.

Furthermore, depending on the client application used, the storage step 801 may also comprise writing to a disk in a cache file containing data of JPIP type of the compressed video sequence progressively received by the client. Such a storage may take a very simple form consisting of adding to the end of the cache file the data-bin increments successively received by the client. There will thus be written, in order, for each image:
- the metadata-bin containing the metadata of indices of moving precincts,
- the main header and tile header data-bins containing the main header and the tile header of the current image,
- the "precinct data-bin" increments received for the current image. According to one variant, if a "precinct data-bin" has been received in a number of distinct increments, the useful data of these increments may be gathered together in a single "precinct data-bin" increment.

The cache file thus written is then self-descriptive, and may be subsequently played back by a client applying the same strategy for replenishing the display as that in step 804 below.

Note that another method of archiving the video sequence on disk could consist of writing a Motion JPEG2000 file as the data are received. No details are given here about the implementation of such a variant.

Finally, note that as far as the cache file is concerned, one functionality concerning the latter could be the possibility of playing it back either from the start to the end of the sequence or from the end to the start. In this latter case, it would then be appropriate to offer the client the possibility of directly decoding the last image of the sequence, which would then become the first image displayed on the screen, independently of the other images of the sequence. For this, we propose optionally adding, to the strategy of caching to disk the video sequence received, the compression and storage of the last image displayed by the client (optional step 807). It is preferable to encode this compressed image in the form of a precinct data-bin as defined in JPIP, consistently with the rest of the stored cache file. Consequently, the client could, if necessary, play the archived sequence in the opposite direction. To do this, all that would be required would be to decompress the image compressed and stored at the end of the cache file, and then to decode and display the precincts indicated as moving of the successive images, from the end to the start of the sequence. This is possible since the detection of motion constitutes a transitive operation. In other words, the moving precincts from an image n to an image n−1 would be the same as those which had been detected as moving from the image n−1 to the image n. Consequently, the precincts indicated as moving for an image n are taken into account to replenish the image n−1 when the sequence is played from the end to the start.

Returning to the decoding/display algorithm described, step 801 is followed by step 802, during which the compressed data received via the "precinct data-bins" are decoded. As explained above with reference to FIG. 7, the other precincts not received from the image are considered as empty precincts, and therefore the image reconstitution obtained by this decoding step is partial if all the precincts of the image are not received. It is nevertheless sufficient, given that the client already has a reference image, in the case where this is not the first image of the sequence, and it is enough to supplement this reference image with the precincts detected as moving. Of course, if it is the first image requested by the client, all the precincts are received.

Next, the reference image stored in decoded form in a memory space of the client device is updated in step 803. As explained above, if this is the first image of the sequence, the updating consists of completely copying the decoded data. In the case where it is not the first image of the sequence, the updating consists in copying the values decoded for the points belonging to the precincts of the set M at their corresponding spatial position in the reference image.

Finally, in step 804 the new current image is displayed, which is equal to the image stored in the reference image after it has been updated.

In step 805, a test is then carried out to determine whether it is the last image of the sequence. If the response to the test is negative, the next image is selected (step 806) and steps 800 to 805 are carried out again. In the case where the last image of the sequence has been processed, the algorithm ends after the possible optional step 807 of storing the last image of the sequence mentioned above.

The modes of implementation described above refer to the case in which the client displays the sequence of images at the resolution level of acquisition by the server. However, JPEG2000 offers the client the possibility of requesting and displaying the images at other resolution levels, lower than that of the original sequence. The invention may also be applied in this case, as described below with reference to FIG. 9. In the case where the client requests the data at a target resolution lower than the acquisition resolution, using JPEG2000 and JPIP it is possible to send only data which can be used to reconstruct the image at this resolution level. It is preferable to carry out the motion detection needed to implement the invention at the resolution level required by the client, but in the domain of spatial representation of the image. To do this, it is necessary to add to the algorithm described in FIG. 6 preliminary steps which consist in carrying out a filtering and a sub-sampling as a function of the wavelet transformation applied, so as bring the original image to the target resolution level. This step of reducing the original resolution is schematically shown in FIG. 9. This step of applying the wavelet transformation E'1 must be carried out prior to the step E1 of determining the moving precincts. The next steps of FIG. 4 (E2, E3, E4, E5) are then applied in a manner analogous to the current IC' and reference IR' images brought to the required resolution level.

The invention claimed is:
1. A method of transmitting a current image of a sequence of digital images between a server device and a client device which are connected by a communication network, said method comprising the steps of:
   detecting motion on the current image, each image of the sequence being encoded in a multi-resolution format and each resolution comprising a set of non-independent elementary entities, the non-independent elementary entities of a given image being non-independent in that one is reconstructible only using another, said detecting being carried out on spatial entities defined with respect to the non-independent elementary entities, between the current image and a reference image; and
   in cases in which at least one moving spatial entity is detected in the current image,
      determining a first set of elementary entities of the current image comprising the elementary entities relating to the at least one moving spatial entity;
      determining a second set of elementary entities of the current image which are necessary for reconstructing the at least one moving spatial entity of the current image;

sending to the client device at least part of each of the elementary entities of the first and second sets; and sending to the client device an auxiliary information item which indicates the elementary entities of the first set.

2. A method according to claim 1, wherein the images are transmitted in accordance with a transmission protocol associated with the encoding format, and the auxiliary information item comprises indices which identify the elementary entities of the first set in accordance with the transmission protocol.

3. A method according to claim 2, wherein the auxiliary information item is transmitted in the form of an optional field of metadata type which is compatible with the transmission protocol.

4. A method according to claim 1, wherein the images are transmitted in accordance with a transmission protocol associated with the encoding format, and the auxiliary information item is associated with a data category.

5. A method according to one of claims 1 or 2 to 4, further comprising a step of updating the reference image, comprising storing the image signal relating to the at least one moving spatial entity of the current image as a replacement for the signal relating to the at least one spatial entity of the same position in the reference image.

6. A method according to one of claims 1 or 2 to 4, wherein detecting a moving spatial entity in the current image comprises calculating the distance between the image signal representative of the entity in question and the image signal representative of the entity of the same spatial position in the reference image and comparing the distance thus obtained with a predetermined threshold.

7. A method according to one of claims 1 or 2 to 4, wherein an image is encoded according to an encoding method comprising the steps of spatial frequency transformation, quantization and entropic coding, and wherein the steps of quantization and entropic coding are applied only to the coefficients resulting from the spatial frequency transformation belonging to the elementary entities of the first and second sets.

8. A method according to one of claims 1 or 2 to 4, further comprising, upon receipt of a first request from a client device, a step of sending the updated reference image to the client device.

9. A method according to one of claims 1 or 2 to 4, further comprising the preliminary steps of, when the resolution of the image required by the client is lower than the initial resolution, filtering and sub-sampling.

10. A method of receiving a current image of a sequence of digital images, comprising the steps of:

with each image of the sequence being encoded in a multi-resolution format and each resolution comprising a set of non-independent elementary entities, the non-independent elementary entities of a given image being non-independent in that one is reconstructible only using another, receiving a plurality of parts of the non-independent elementary entities of the current image;

determining a first set of elementary entities of the current image among the elementary entities received corresponding to at least one spatial entity of the current image which is moving with respect to a reference image stored beforehand;

decoding the set of elementary entities received so as to reconstruct the at least one moving spatial entity; and storing the result of the decoding in a storage space containing the reference image, as a replacement for the image signal relating to the at least one spatial entity of the reference image of the position thus determined, wherein the images are transmitted in accordance with a transmission protocol associated with the encoding format, and wherein said step of determining a first set of elementary entities corresponding to at least one moving spatial entity comprises reading an auxiliary information item transmitted in accordance with the transmission protocol.

11. A method according to claim 10, further comprising an additional step of displaying the reference image.

12. A method according to claim 10, wherein the auxiliary information item contains the indices which identify the elementary entities belonging to the first set in accordance with the transmission protocol.

13. A method according to claim 10, wherein the auxiliary information item is received in the form of the association of the data with a category defined in accordance with the transmission protocol.

14. A method according to one of claim 10, 11, 12 or 13, further comprising a step of storing in a temporary memory space parts of elementary entities received for the current image.

15. A method according to claim 14, wherein the parts of elementary entities received for the current image are stored in a file after the parts of elementary entities received for the preceding image of the sequence.

16. A method according to claim 15, wherein the last image of the sequence of images is entirely stored in encoded form in the memory of the client device.

17. A method according to claim 14, wherein the parts of elementary entities received for the current image are stored in a storage space as a replacement for the parts of elementary entities received for the preceding image.

18. A method according to claim 1 or 10, wherein the encoding format of the sequence of images is the Motion JPEG-2000 format and the transmission protocol is the JPIP protocol.

19. A device for transmitting a current image of a sequence of digital images between a server device and a client device which are connected by a communication network, each image of the sequence being encoded in a multi-resolution format, each resolution comprising a set of non-independent elementary entities, comprising:

means for detecting motion on the current image, each image of the sequence being encoded in a multi-resolution format and each resolution comprising a set of non-independent elementary entities, the non-independent elementary entities of a given image being non-independent in that one is reconstructible only using another, the detecting being carried out on spatial entities defined with respect to the non-independent elementary entities, between the current image and a reference image;

means for, in cases in which at least one moving spatial entity is detected in the current image, determining a first set of elementary entities of the current image comprising the elementary entities relating to the at least one moving spatial entity;

determining a second set of elementary entities of the current image which are necessary for reconstructing the at least one moving spatial entity of the current image; and sending to the client device at least part of each of the elementary entities of the first and second sets; and means for sending to the client device an auxiliary information item which indicates the elementary entities of the first set.

20. A device according to claim 19, wherein the images are transmitted in accordance with a transmission protocol associated with the encoding format, and wherein the auxiliary information item comprises indices which identify the elementary entities of the first set in accordance with the transmission protocol.

21. A device according to claim 20, wherein the auxiliary information item is transmitted in the form of an optional field of metadata type which is compatible with the transmission protocol.

22. A device according to claim 19, wherein the images are transmitted in accordance with a transmission protocol associated with the encoding format, and wherein the auxiliary information item is associated with a data category.

23. A device according to one of claims 19 or 20 to 22, further comprising means for updating the reference image, the updating comprising storing the image signal relating to the at least one moving spatial entity of the current image as a replacement for the image signal relating to the at least one spatial entity of the same position in the reference image.

24. A device according to one of claims 19 or 20 to 22, further comprising means capable of calculating the distance between the image signal representative of the entity in question and the image signal representative of the entity of the same spatial position in the reference image and means for comparing the distance thus obtained with a predetermined threshold.

25. A device according to one of claims 19 or 20 to 22, further comprising means for carrying out the spatial frequency transformation, quantization and entropic coding of a digital image, wherein the means for quantization and entropic coding are applied only to the coefficients resulting from the spatial frequency transformation belonging to the elementary entities of the first and second sets.

26. A device according to one of claims 19 or 20 to 22, further comprising means for receiving a first request from a client device and means for sending the updated reference image to the client device.

27. A device according to one of claims 19 or 20 to 22, further comprising means for, when the resolution of the image required by the client is lower than the initial resolution, filtering and sub-sampling the digital image.

28. A device for receiving a current image of a sequence of digital images, each image of the sequence being encoded in a multi-resolution format, each resolution comprising a set of non-independent elementary entities, said device comprising:
means for, with each image of the sequence being encoded in a multi-resolution format and each resolution comprising a set of non-independent elementary entities, the non-independent elementary entities of a given image being non-independent in that one is reconstructible only using another, receiving a plurality of parts of the non-independent elementary entities of the current image;
means for determining a first set of elementary entities of the current image among the elementary entities received corresponding to at least one spatial entity of the current image which is moving with respect to a reference image stored beforehand;
means for decoding the set of elementary entities received so as to reconstruct the at least one moving spatial entity; and
means for storing the result of the decoding in a storage space containing the reference image, as a replacement for the image signal relating to the at least one spatial entity of the reference image of the position thus determined,
wherein the images are transmitted in accordance with a transmission protocol associated with the encoding format, and wherein said means for determining a first set of elementary entities corresponding to at least one moving spatial entity are capable of reading an auxiliary information item transmitted in accordance with the transmission protocol.

29. A device according to claim 28, further comprising means for displaying a digital image.

30. A device according to claim 28, wherein the auxiliary information item contains the indices which identify the elementary entities belonging to the first set in accordance with the transmission protocol.

31. A device according to claim 28, wherein the auxiliary information item is received in the form of the association of the data with a category defined in accordance with the transmission protocol.

32. A device according to one of claim 28, 29, 30 or 31, further comprising means for storing in a temporary memory space parts of elementary entities received for the current image.

33. A device according to claim 32, further comprising means capable of storing the parts of elementary entities received for the current image in a file after the parts of elementary entities received for the preceding image of the sequence.

34. A device according to claim 33, further comprising means capable of entirely receiving the last image of the sequence of images and means capable of storing the received image in encoded form in the memory of the client device.

35. A device according to claim 32, further comprising means capable of storing the parts of elementary entities received for the current image in a storage space as a replacement for the parts of elementary entities received for the preceding image.

36. A device according to one of claim 19, 22, 28, 29, 30, 31 or 33-35, further comprising means capable of implementing the Motion JPEG2000 format for encoding the sequence of images and the transmission protocol is JPIP.

37. A communication apparatus, comprising a device according to any one of claims 19 or 20 to 22.

38. A communication apparatus, comprising a device according to any one of claim 28, 29, 30, 31 or 33-35.

39. A computer, comprising means for implementing the transmission method according to any one of claims 1 or 2 to 4.

40. A computer, comprising means for implementing the reception method according to any one of claim 10, 11, 12, 13 or 15-19.

41. A non-transitory computer-readable data storage means, optionally be partially or completely removable, and which can be read by a computer system, storing, in executable form, instructions for a program for causing the computer system to implement the transmission method according to one of claims 1 or 2 to 5, when the program is loaded and executed by the computer system.

42. A non-transitory computer-readable data storage means, optionally be partially or completely removable, and which can be read by a computer system, storing, in executable form, instructions for a program for causing the computer system to implement the reception method according to one of claim 10, 11, 12, 13 or 15-17, when the program is loaded and executed by the computer system.

43. A non-transitory computer-readable storage medium storing, in executable form, a computer program which can be read by a microprocessor, comprising portions of software code capable of implementing the transmission method according to one of claims 1 or 2 to 4, when the computer program is loaded and executed by the microprocessor.

44. A non-transitory computer-readable storage medium storing, in executable form, a computer program which can be read by a microprocessor, comprising portions of software code capable of implementing the reception method according to one of claim 10, 11, 12, 13 or 15-17, when the computer program is loaded and executed by the microprocessor.

* * * * *